May 27, 1930.  J. W. MARDEN ET AL  1,760,367

DUCTILE CHROMIUM AND METHOD OF PRODUCING THE SAME

Filed April 27, 1926

INVENTOR
JOHN W. MARDEN
MALCOLM N. RICH
BY 
ATTORNEY

Patented May 27, 1930

1,760,367

UNITED STATES PATENT OFFICE

JOHN WESLEY MARDEN AND MALCOLM N. RICH, OF EAST ORANGE, NEW JERSEY, ASSIGNORS TO WESTINGHOUSE LAMP COMPANY, A CORPORATION OF PENNSYLVANIA

DUCTILE CHROMIUM AND METHOD OF PRODUCING THE SAME

Application filed April 27, 1926. Serial No. 104,917.

This invention relates to a method of manufacturing ductile chromium and to the products produced thereby.

Chromium as a metal has long been known in the arts and many methods of preparing the same have been proposed. The literature on the subject refers to chromium as being a brittle, non-plastic metal. We have found to the contrary, that chromium prepared in accordance with the method described hereinafter is tough, fibrous, and elastic and of high tensile strength and is ductile. We have been able by means of our process, to produce from this refractory, brittle, non-plastic metal, a ductile body which may be fashioned into many useful shapes for utilization in commerce. Among such uses may be mentioned, resistors in electric furnaces, toasters, electric irons, etc., as a substitute for nichrome. Our material possesses many advantages over nichrome, the principal one being the higher temperature to which it may be heated. We have also found that the material produced in accordance with our process does not oxidize to any detrimental extent when heated to high temperatures in the air. Our product is also useful in the manufacture of electric devices, such as lamps, radio tubes, X-ray tubes, lightning arresters, rectifiers and similar devices, requiring a leading-in conductor capable of sealing to a suitable glass, that is to say, our product may be used as a seal. It is also useful for employment as a spray material to coat articles to render the same resistant to attack by the atmosphere, sea-water and the like.

Prior to our invention all efforts to work chromium in a practical manner have failed and so far as we are aware, no one has succeeded in modifying its hard brittle structure in such manner as to obtain a ductile body therefrom.

Our process essentially comprises three stages, each of which contributes its influence upon the other, so as to make the ultimate result possible. These stages, briefly stated, are (1) the production of a substantially pure powder free from oxides, carbides, silicides, intermetallic constituents, etc., and possessing the proper grain size and grain size difference; (2) the sintering and heat-treatment of such powder in either vacuo or in hydrogen to form a coherent metal body, and (3) the mechanical working of the coherent metal at suitable temperatures and under properly controlled conditions. By mechanical working we mean rolling, swaging, drawing or otherwise distorting the metal to the desired size and shape and to produce therefrom a ductile body.

In describing our process reference is made to the accompanying drawing in which.

Figure 1:
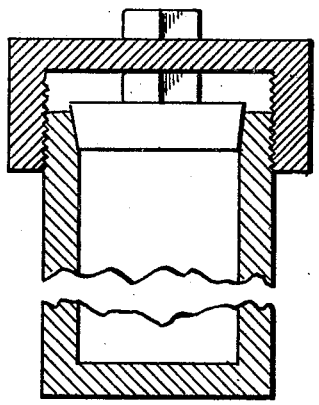
Fig. 1 is a vertical cross-sectional view of a bomb employed in the manufacture of the powder.

For the purpose of producing chromium in a condition suitable for working, the metal must be substantially free from impurities. Even though we do not believe that small amounts of such impurities as iron and nickel adversely affect the working qualities of chromium, we do believe they materially affect the melting point. Pure chromium has a melting point not far from that of its oxide ($Cr_2O_3$) which is given in the literature as being 2050° C.

We have found that the melting point of pure chromium metal appears to be about 1900° C. apparent temperature. We have also determined that admixtures of small amounts of impurities such as intermetallic compounds tend to lower the melting point materially and to cause in many cases, extreme brittleness to such an extent that the metal cannot be satisfactorily worked. Oxide contaminations appear to affect both the melting point and working qualities, while the carbide and silicide, because of their extreme hardness, are undesirable. Methods described in the literature are unsatisfactory for the preparation of chromium of a sufficient degree of purity for satisfactory mechanical working.

Preparation of the powder

In preparing chromium powder, suitable for subsequent fabrication into coherent workable metal, the process described and claimed in copending application Serial No. 618,544, filed Feb. 12, 1923, assigned to the same assignee as the present application, was followed. Some of the advantages to be gained by the use of this process, are that accurate control of the purity of the reaction products can be secured and maintained, through the employment of substantially pure starting materials. In addition the reaction products can be controlled so that they are soluble in either water or acids, leaving after washing, a substantially pure metal powder. Furthermore, this process lends itself admirably to the production of metal powders of predetermined particle size and difference in grain size, which is an important factor in connection with performing the subsequent operations of briquetting, sintering, heat-treating and mechanical deformation.

In practicing the foregoing method of reduction the proportions by weight representing the equation

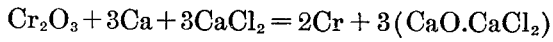

$$Cr_2O_3 + 3Ca + 3CaCl_2 = 2Cr + 3(CaO.CaCl_2)$$

have been found to yield the best results. Other proportions of oxide to calcium and to calcium chloride may be employed and metal powder obtained, but the metal product secured may be found to run from extremely fine material to extremely coarse beads, or run all to beads or all to extremely fine powder. A reduction producing either of these extremes is undesirable, therefore a change must be made upon which will produce a metal powder of substantially the same degree of fineness with a minimum difference in grain size. A convenient method of controlling the reduction which we have found desirable to employ, is to control the calcium chloride content of the charge. Owing to the high heat of fusion of calcium chloride, raising or lowering the amount of this material in the charge and maintaining other conditions constant, has the effect of slowing down or hastening the exothermic reaction which takes place and consequently the rate of reduction of the chromium containing compound. This control over the rate of reduction also affects the grain size, and grain size difference, and the preferable or desired grain size and grain size difference may be readily obtained.

In preparing the charge we take a chromium compound, such as the oxide previously mentioned, a halide, alkali or alkaline earth chromate, which is chemically pure and free from admixed metal compounds and carbon-bearing compounds, and add thereto the calculated amount of chip calcium (freshly cut) plus a sufficient excess to assure complete reduction, usually a 25% excess will be found sufficient. To this is added dried calcium chloride (ground or pulverized and chemically pure) in such amount as found most desirable. These three ingredients are intimately mixed and tamped into a bomb such as illustrated in Fig. 1. After carefully sealing the bomb to prevent access of air from the surrounding atmosphere, the bomb may be heated in any suitable manner to a temperature of about 900° C. at which temperature the bomb is maintained for a period of approximately one hour.

Although a halide or alkali or alkaline earth compound of chromium may be employed we have found it preferable to use chromium oxide ($Cr_2O_3$) which may be prepared with a sufficient degree of purity from ammonium chromate. Although chromium oxide is a refractory oxide, under the conditions of reduction specified, it can be readily and completely converted to metal powder.

The proportions by weight employed in making up the charge are substantially as follows:

750 grams of $Cr_2O_3$.
900 grams of Ca (chipped).
2000 grams of $CaCl_2$ (dehydrated and ground).

After the reduction has been effected, the bomb is permitted to cool to room temperature. The fused charge may be fed slowly into a large volume of filtered water which is continuously agitated. After thorough disintegration of the charge, the calcium chlorides are removed by decantation and the calcium oxide by solution in dilute nitric acid. As the metal powder becomes free of calcium salts, two or more final nitric acid washes with more concentrated acid (1 part acid to 5 parts water) are given, mechanical stirring being maintained continually. The acid is removed by decantation and the metal powder thoroughly and quickly washed with pure water. The metal powder is then washed with alcohol and ether to remove the water. The powder is then dried in vacuo to remove the alcohol and ether.

The metal powder thus prepared may then be screened through a 200 mesh sieve, the oversize particles being discarded. Any iron impurity in the powder from the bomb may be readily removed by a strong magnet. The metal powder prepared in accordance with the instructions given above will be found suitable for use in the metallurgical process hereinafter described for preparing ductile chromium in rod, wire or sheet form.

The next operation comprises briquetting the powder and sintering to form coherent bars of the metal suitable for conducting the subsequent mechanical working steps.

Sintering to form ingots

In the past it has been deemed impossible to sinter or heat-treat pressed bars of chromium in hydrogen and obtain a workable ductile metal ingot. We have found that under proper conditions the sintering and heat-treating of chromium may be done in hydrogen and have further found that the bars thus treated possess many physical characteristics which make the same especially suitable for mechanical deformation.

Since chromium is extremely volatile below its melting point, heat-treating in vacuo has commercial limitations. A workable metal may be obtained by such treatment, however, the resultant product is not dense and homogeneous since the heat-treated slug is somewhat porous as a result of volatilization. The treatment in hydrogen with proper regulation of the treating current eliminates practically all volatilization of the chromium during heat-treating so that bars of maximum density are obtained.

Our process of sintering and heat-treating comprises first pressing the metal powder, obtained in accordance with the process described above, in a segmental mold upon which both horizontal and vertical pressure may be exerted. The pressure applied varies somewhat with the grain size of the metal powder and the size of the bar compacted and also with the type of mold or press employed, however, we have found that a minimum pressure of 50,000 to 65,000 lbs. per square inch is satisfactory for the grade of powder mentioned above and gives a ¼"x¼"x16" bar of chromium which may be handled without breaking and which may be suspended in the heat-treating furnace without previous sintering.

Care should be exercised in pressing the powder for the reason if the pressure is too great, the adsorbed gases are not entirely eliminated during heat-treatment and blowholes or cavities are formed which are extremely detrimental to the working of the metal. A pressure should be applied which will give a bar of sufficient strength for handling and suspending during heat-treatment and have sufficient porosity to eliminate substantially all of the absorbed gases usually occurring in such powdered metals and which on treating will give a bar of sufficient density and proper grain size to respond to subsequent swaging and mechanical working.

Figure 2:
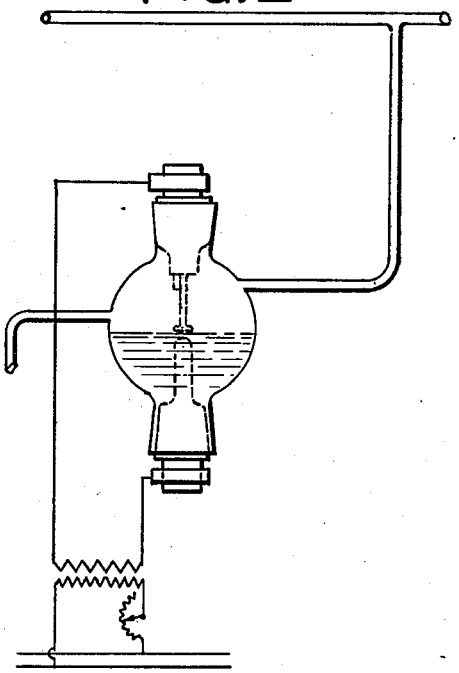
Fig. 2 is a vertical elevation, partly in section, of a suitable sintering furnace.
Figure 3:
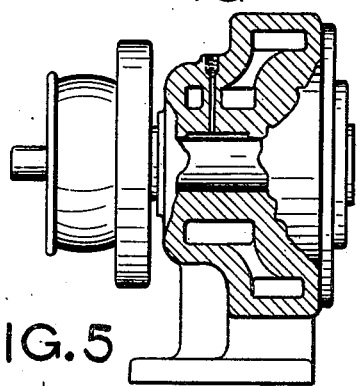
Fig. 3 is a view of one form of swaging head which may be employed.
Figure 4:
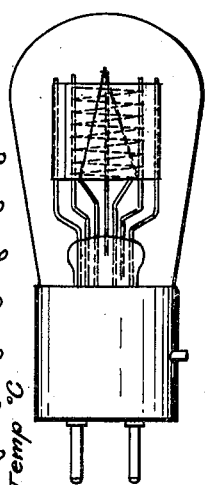
Fig. 4 is a view of a radio tube of standard design but embodying a leading-in wire of chromium produced in accordance with our method.

The pressed bar is removed from the mold and suspended in a furnace such as that illustrated in Fig. 2. The sintering and heat-treating operations are preferably performed in one continuous operation and in the same furnace for the reason that it is advisable to maintain strict control over the oxygen and moisture content of the hydrogen atmosphere utilized during the heat-treatment.

The furnace illustrated is provided with connections for permitting a continuous flow of hydrogen therethrough. The hydrogen atmosphere must be substantially free from oxygen, moisture or hydrocarbons. While we have found that hydrogen will reduce chromium oxides ($CrO$ and $Cr_2O_3$) formed by exposure of the bar to oxidizing conditions and a heat-treated slug can be obtained which will evidence a marked degree of ductility on subsequent working, any appreciable amount of oxide, moisture or carbon compounds in the hydrogen atmosphere during treating hastens the rate of evaporation of the metal slug and tends to build up a surface condition of radiating crystals which in other refractory metals has been found to affect the working qualities of the metal ingots. These surface crystals may also be formed by treatment at too high temperatures or for too long a period of time.

The hydrogen, prior to being passed through the furnace, should be carefully purified, and in our process this has been done by passing the gas as it comes from the generator through a preheater to combine the free oxygen and then over a battery of caustic potash absorption towers. The gas is then bubbled through fuming or concentrated sulfuric acid, and again through a battery of caustic soda and phosphorus pentoxide tubes to remove the last traces of moisture from the gas. The gas thus purified is admitted to the furnace at a rate of approximately 12 cubic feet per minute.

The furnace is then filled with hydrogen which latter is allowed to flow through the furnace in a strong steady stream. The pressed bar having previously been placed in the furnace is then heated by passage of current directly therethrough. The furnace illustrated is described and claimed in copending application Serial No. 488,230, filed July 28, 1921, and assigned to the present assignee, and in view thereof, no detailed description is given herein. This application has matured into Patent No. 1,596,306, Aug. 17, 1926.

In the heat-treatment of chromium bars prepared as specified above, a slow temperature rise should be maintained during the early stage to facilitate the removal of the adsorbed and absorbed gases. Shrinkage takes place at about 70% of the fusion current, and continues up until the current is about 80% fusion current. The bar is then maintained at the proper treating current for the time interval required to develop maximum density and coherence.

The following heat-treating schedule for ¼" x ¼" x 8" bars has been found to give suitable metal for satisfactory working. It is to be understood, however, that the schedule given is merely by way of example and that we do not wish to be confined thereto, although the broad principle expressed above underlying the schedule is an important feature in connection with producing satisfactory metal.

The fusion current of bars of the size specified is first determined under the normal operating conditions and subsequently, the bars are treated at heat-treating currents ranging from about 80% to 90% of the fusion current. The normal treating schedule of any bar is dependent upon the nature of the powder employed, but with a powder of the grade as produced above, we have found that a fairly rapid temperature raise schedule may be employed after degasification of adsorbed and absorbed gases has been accomplished, such degasification taking place below any appreciable sintering. Thereafter the temperature of the bar is rapidly raised at one minute intervals to about 85% of the fusion current and maintained at the highest temperature from about 5 to 10 minutes.

Although many variations of this general heating schedule may be obtained and used and treating currents of substantial difference than that exemplified may be applied, the essential basic principles will remain the same. For example, it may be desirable to prevent excessive grain growth during treatment therefore a shorter interval of time at treating temperatures may be adopted. It is to be understood that the treating temperature is the highest point attained during the heat treatment of the bars. In general, the grain size difference produced by higher heating currents or longer or shorter intervals of time of heating may not exert as great an effect upon the working qualities of the metal as it does in the more refractory metals, i. e., molybdenum and tungsten, because the recrystallization temperature of chromium is relatively low and it is relatively easy to work this metal at the recrystallization temperature for the purpose of effecting grain structure refinement prior to the development of structural characteristics of strength, hardness, pliability, etc., as a result of certain amounts of cold-working.

After sintering and heat-treating, the bars are permitted to cool to room temperature, after which they are removed from the furnace.

The bars are then mechanically worked to form wire, filament, and the like.

Mechanical working

The working of the dense, coherent and sintered ingot may be accomplished by any of the well known methods, such as swaging, rolling, drawing, etc., provided certain precautions are observed in heating the metal to the proper temperature during working and particularly throughout the early stages.

If chromium is swaged at temperatures too high above its recrystallization temperature, refinement in grain structure may not be materially produced because the grain growth which takes place among the shattered crystals is so rapid that large grains are again developed. In this manner extremely brittle friable bars are formed and these quickly break up during working so as to render the mechanical working impossible. We have determined that if the temperature at swaging is at or slightly above the recrystallization temperature of the metal, the extremely large grain growth developed as a result of excessive temperatures or time intervals during heat treatment, or by the hydrogen which may have a tendency to cause the formation of large grain structures in chromium and other metals, or by a combination of these three factors, is easily destroyed and replaced by more uniform and smaller crystals or grains and the working of rod to smaller sizes is thereby greatly facilitated and aided. In this manner, the inherently brittle characteristic grain structure of the metal body is replaced by a more workable grain structure susceptible to later cold-working procedures.

The temperature of recrystallization may be stated as that temperature which effects recrystallization of distorted or broken up grains caused by mechanical working. In general, this temperature is lower the greater the degree of previous cold-working. Cold-working is understood as being working at temperatures below the recrystallization temperature. With chromium having had no previous cold-working, the recrystallization is estimated to be between 600° C. and 800° C. as bars of chromium worked between 800° C. and 1100° C. show little or no evidence under microscopical examination of having been cold-worked.

By establishing the recrystallization temperature in this manner the successful swaging of chromium bars was accomplished.

In general, swaging operations for chromium resolves itself into an early hot-working period between 800° C. to 1100° C. until the bar has become sufficiently rounded off and elongated so that a continuous swaging process can be applied. It is to be appreciated that the reason for heating the bars above the recrystallization temperature is because of the cooling which takes place during hand-swaging. When continuous swaging is practiced, more accurate temperature control can be maintained. This early swaging operation in addition to effecting rounding and elongation, also produces a sufficient refinement in grain structure so that cold-working may be employed. A gradual decrease in temperature, on continuous swaging operations, can be effected until the diameter is reduced sufficiently to permit drawing. Rolling operations are performed essentially in the same manner, although it is found that the early distortion and grain refinement is done by swaging, after which rolling to wire or sheet may be better practiced.

As stated heretofore, the recrystallization temperature of chromium decreases as the metal is worked in view of which it is essential to lower the temperature of working as the working progresses. In Fig. 6 we have illustrated a curve indicating the decrease in temperature as the metal is worked, thus furnishing an approximate schedule which may be followed in working chromium.

If desired, the chromium bars may be worked under another metal. For example, we have taken previously sintered bars, rounded the same by machining and encased them in molybdenum and swaged them hot, the encased bars being fed to the rolls or swaging machine through an iron tube to prevent cooling and to maintain the same at the proper temperature for suitable and satisfactory working.

Figure 5:
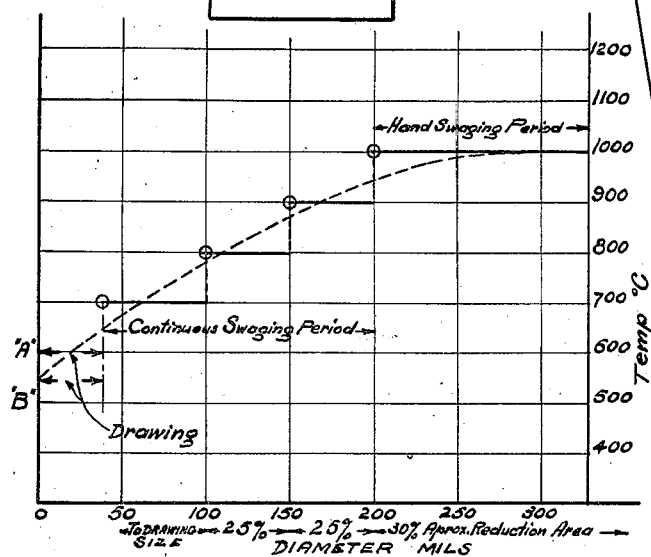
Fig. 5 is a graph showing a step-curve representing approximately the working temperatures with reduction in diameter.
Figure 5:

The chromium obtained by following the method outlined above is ductile and has been found by us to be suitable for leading-in conductors for radio tubes (Fig. 5) and the like. The advantage of using chromium as a leading-in conductor resides in its stiffness which permits its employment as a straight-through leading-in conductor, the inner end of the conductor may be then employed as the support for the elements of the tube. The three-piece leading-in conductor comprising a piece of copper wire united to a small piece of dumet (copper-coated nickel-iron alloy) used as the sealing material and the latter united to a piece of nickel wire employed as the support, may be dispensed with and in its place a single piece of chromium wire employed.

Modifications of our process may occur to those skilled in the art, but such modifications are contemplated as come within the scope of our invention as defined by the appended claims.

What is claimed is:

1. The process of producing malleable chromium masses which comprises compacting metal powder of substantial purity and of predetermined particle size and particle size contrast into ingots of predetermined density, heating the same to drive off the occluded and absorbed gas content thereof at a temperature substantially lower than the combination temperature with the metal powder and subsequently consolidating the ingot by subjecting it to a temperature approximating but below its melting point, the entire degasifying and sintering treatments being conducted in an environment inert with respect to the metal.

2. The process of producing malleable chromium masses which comprises compacting metal powder of substantial purity and of predetermined particle size and particle size contrast into ingots of predetermined density, heating the same to drive off the occluded and absorbed gas content thereof at a temperature substantially lower than the combination temperature of the gas with the metal and subsequently consolidating the ingot by subjecting it to a temperature approximating but below its melting point, the entire degasifying and sintering treatments being conducted in an inert environment and in one continuous operation.

3. The process of producing substantially pure chromium suitable for mechanical working which comprises suitably degasifying an agglomerated mass of metal powder of substantial purity, at low temperatures and subsequently sintering to a coherent dense form at high temperatures approximating but below the melting point thereof, said heating and sintering procedure being conducted in hydrogen and in substantially one continuous operation.

4. The process of producing a worked body of chromium which comprises agglomerating substantially pure chromium powder, heating the agglomerated mass at low temperatures in hydrogen to degasify, subsequently heating in hydrogen at high temperatures approximating but below the fusion temperature to effect substantial sintering and consolidation thereof, said heat treatments being performed consecutively without intervening exposure of the metal to deleterious gaseous absorption and thereafter subjecting the resultant sintered metal ingot to repeated mechanical deformation at temperatures approximating at least 800° C.

5. The method of forming bodies of chromium such as wire, rod, sheet, filament and the like, which comprises the steps of preparing a substantially pure chromium metal powder, compacting the metal powder, sintering the compacted metal powder in an inert environment in such manner as to effect substantial elimination of the adsorbed and absorbed gas content of the powder prior to actual sintering thereof, and thereafter repeatedly working the sintered article at temperatures ranging downward from approximately 1100° C.

6. The method of forming bodies of chromium such as wire, rod, sheet, filament and the like which comprises the steps of preparing a substantially pure chromium metal powder, agglomerating to compact form, heat-treating the compacted article in a reducing atmosphere initially at a low temperature to effect entire degasification thereof and subsequently at a higher temperature to effect sintering and coalescing of the degasified metal powder to a coherent body, said two heating operations being conducted consecutively and without intervening exposure of the metal powder to deleterious gaseous absorption, and thereafter effecting mechanical deformation of the sintered body at elevated temperatures approximating 1000° C.

7. The method of producing shaped bodies of coherent chromium which comprises preparing a substantially pure chromium metal powder, agglomerating the powder to a compact mass, degasifying the mass in an inert environment at relatively low temperatures at which the metal powder does not combine with the liberated gases, continuing the heat-treatment at more elevated temperatures to effect a sintering and coalescing of the degasified metal powder, without intervening exposure of the metal powder to deleterious gaseous absorption, and thereafter repeatedly mechanically working the sintered mass to desired shape and size at elevated temperatures decreasing downwardly from approximately 1100° C. as the working progresses.

8. In the process of manufacturing bodies of chromium comprised of the steps of preparing a substantially pure chromium metal powder, consolidating said powder, effecting a sintering to coherent form, and then mechanically working at elevated temperatures to the desired shape and size, the step in the manufacturing process which is comprised substantially of effecting the sintering operation in an inert environment in two consecutively applied stages, the first stage at a substantially low temperature to effect a degasification of the metal powder, and the second stage at a relatively high temperature to effect consolidation and coalescing of the degasified metal powder, said stages being applied consecutively without intervening exposure to deleterious gaseous absorption.

9. In the process of manufacturing bodies of chromium comprised of the steps of preparing a substantially pure chromium metal powder, consolidating the powder to compact form, heat-treating to a coherent body, and then mechanically working at elevated temperatures to the desired form, the step in the process comprised substantially of effecting the heat-treating of the compacted metal powder to coherent form in an atmosphere of substantially pure dry hydrogen and conducting the heating process in two stages, first at a substantially low temperature to effect substantial removal of the adsorbed and absorbed gas content of the metal powder below the combining temperature of the metal powder for the liberated gases and then at a substantially higher temperature to effect consolidation and coalescing of the metal powder to coherent form, said two heating operations being applied consecutively without intervening exposure of the metal powder to deleterious gaseous absorption.

In testimony whereof, we have hereunto subscribed our names this 24th day of April, 1926.

JOHN WESLEY MARDEN.
MALCOLM N. RICH.